United States Patent

Vilenchik et al.

[11] Patent Number: 5,190,658
[45] Date of Patent: Mar. 2, 1993

[54] METHOD FOR SIZE EXCLUSION CHROMATOGRAPHY

[75] Inventors: Lev Z. Vilenchik, Longmeadow; Roger C. Ayotte, Springfield, both of Mass.; Jawed Asrar, Chesterfield; Christopher J. Hardiman, St. Louis, both of Mo.

[73] Assignee: Monsanto Company, St. Louis, Mo.

[21] Appl. No.: 830,093

[22] Filed: Feb. 3, 1992

[51] Int. Cl.$^5$ .............................................. B01D 15/08
[52] U.S. Cl. .................... 210/656; 210/198.2; 210/635; 530/417
[58] Field of Search ............. 210/635, 656, 198.2; 530/417

[56] References Cited

U.S. PATENT DOCUMENTS

| | | | |
|---|---|---|---|
| 4,160,728 | 7/1979 | Kirkland | 210/656 |
| 4,822,593 | 4/1989 | Wilhelmy | 423/629 |
| 4,900,537 | 2/1990 | Wilhelmy | 423/629 |
| 5,015,373 | 5/1991 | Carr | 210/656 |
| 5,037,795 | 8/1991 | Wieserman et al. | 502/401 |
| 5,100,547 | 3/1992 | Hariman | 210/656 |

OTHER PUBLICATIONS

B. G. Belenkii and L. Z. Vilenchik, "Methodological Problems of Gel-Permeation Chromatography (GPC)", Chapter 4, *Modern Liquid Chromatography of Macromolecules*, Elsevier (1983), pp. 149-163.

*Primary Examiner*—Ernest G. Therkorn
*Attorney, Agent, or Firm*—Thomas E. Kelley; Richard H. Shear

[57] ABSTRACT

An apparatus and a method for size exclusion chromatography is provided. The apparatus is a chromatographic column adapted for use in size exclusion chromatography by having dimensions suitable for size exclusion chromatography and by having a packing material comprising generally spherical particles having wedge-shaped macropores. Preferred particles are in the shape of lamellar and/or acicular crystals extending radially outwardly from a central core region and comprise aluminum oxide, aluminum hydroxide or a mixture thereof. The method involves passing a solution of macromolecules through a column adapted for size exclusion chromatography packed with such particles. The particles effectively and efficiently separate a wide range of macromolecules in decreasing order of their molecular weight.

3 Claims, 4 Drawing Sheets

MOLECULAR WEIGHT
A - 3,250
B - 28,500
C - 156,000
D - 1,030,000
E - 8,500,000

MOLECULAR WEIGHT
A —        5,000
B —       22,000
C —       68,000
D —      170,000
E —      368,000
F —    1,113,000
G —   20,000,000

2 ml/min 1 ml/min

METHOD FOR SIZE EXCLUSION CHROMATOGRAPHY

FIELD OF THE INVENTION

This invention relates in general to liquid chromatography and more particularly to packed columns and a method for size exclusion chromatography using alumina particles as the stationary phase.

BACKGROUND OF THE INVENTION

Liquid chromatography typically refers to separation processes in which a solution of dissolved substances is passed through a tube, called a chromatographic column, filled with a porous granules, called a stationary phase. As the liquid leaves the tube, the substances are separated into single components due to their attraction to the porous medium in the tube. In other words, as a dissolved mixture passes through a chromatographic column, the molecules of substances being separated reside for some time in the stationary phase (where their flow rate essentially stops) and for some time in the mobile liquid phase (where they flow at the same rate as the liquid phase).

Among the variety of chromatographic techniques, there are two general types of liquid chromatography: adsorption chromatography and size exclusion chromatography. In adsorption chromatography the components are separated due to chemical or physical interaction between the components to be separated and the stationary phase. The amount of time that molecules spend in either the liquid or solid phases within the chromatographic column depends on their chemical or physical attraction to the solid phase particles. The molecules that are more readily attracted reside in the stationary phase longer than those that are less easily attracted; as a result, they move through the chromatographic column more slowly, and thus the separation of mixtures into individual components can be effected.

In size exclusion chromatography, the separation of components is a function of their molecular size and the stationary phase typically does not attract the components. Separation depends on the amount of time that the substances spend in the porous stationary phase as compared to time in the fluid. The probability that a molecule will reside in a pore depends on the size of the molecule and the pore. In addition, the ability of a substance to permeate into pores is determined by the diffusion mobility of macromolecules which is higher for small macromolecules. Very large macromolecules may not penetrate the pores of the stationary phase at all; and, for very small macromolecules the probability of penetration is close to unity. While components of larger molecular size move more quickly past the stationary phase, components of small molecular size have a longer path length through the pores of the stationary phase and are thus retained longer in the stationary phase.

Size exclusion chromatography is widely utilized in a variety of scientific fields. In the biological sciences, size exclusion chromatography is used for the isolation and purification of biological molecules, such as peptides, hormones or DNA. Size exclusion chromatography is used in the polymer chemistry field to determine molecular weight distribution of polymers and to isolate or resolve polymers of a particular size from a mixture of variously sized polymers.

A variety of stationary phases have been developed for use in size exclusion chromatography, dextran, cross-linked polymers of styrene-divinylbenzene, acrylamide or vinylacetate, or macroporous inorganic material, such as silica, activated charcoal, or alumina. Although such stationary phases are widely used, a number of drawbacks limit their usefulness.

Although polymer-based materials are generally used as the stationary phase in size exclusion chromatography, their usefulness is limited. For instance, high flow rates desirable with modern high pressure chromatographic systems are generally not possible with polymeric stationary phases. And, the choice of solvents that can be used as the mobile phase in polymer-based stationary phase size exclusion chromatography columns is limited by the solubility of a polymeric stationary phase. Many otherwise useful solvents cannot be used because they either degrade polymeric stationary phases or shrink or swell the polymer thereby disrupting the separation characteristics and capabilities of the sorbent. Even standard solvents such as water or methanol cannot be used with some polymeric stationary phases.

Inorganic materials, e.g. silica, charcoal and alumina, have also been employed as the stationary phase for size exclusion chromatography without some of the problems associated with polymeric materials. But inorganic sorbents present disadvantages of their own. For instance, silica particles are not suitable for use with alkaline solvents. The reactivity of silica particles also provides the opportunity for undesirable interaction between the chemical mixture and the silica particles.

Alumina particles have not been widely employed as a stationary phase for size exclusion chromatography because generally available alumina particles have too narrow a pore size distribution to effectively separate a wide range of macromolecules. Moreover, alumina particles that have been used for chromatography have not allowed sufficiently good flow rate, resulting in restricted flow of the mobile phase through the stationary phase.

U.S. Pat. Nos. 4,822,593; 4,900,537 and 5,037,795 disclose alumina particles comprising crystals extending radially outward from a central core, e.g. gaving wedge-shaped macropores, and their use for certain chromatographic applications. Chromatographic columns packed with such particles are available from Biotage, Inc. (Charlottesville, Va.); in columns for normal phase chromatography the particles are uncoated; and in columns for reverse phase chromatography the particles are coated, e.g. with polybutadiene. The use of such particles for separating macromolecules according to size has not been suggested nor is any discussion of the usefulness of such particles for size exclusion chromatography found in the literature.

Modern chromatographic techniques use high pressure to decrease the time necessary to analyze a chemical composition. When high pressure is used it is important that the flow of the mobile phase through the stationary phase be as unrestricted as possible. Some materials currently used for size-exclusion chromatography allow the development of significant "back pressure" in the column which restricts the flow of liquid through the column, decreasing the efficiency of the separation. The creation of a back pressure is an even more significant problem for size exclusion chromatography when attempted on a large scale, e.g. as a separation process.

There is, therefore, a need in the chromatographic industry for a stationary phase material for use in size exclusion chromatography that can more quickly and effectively separate macromolecules of a wide range of molecular weights with a variety of solvents without degrading the stationary phase or reducing its separation capabilities. There is also a need for a size exclusion chromatographic stationary phase that exhibits improved flow rate capabilities.

SUMMARY OF THE INVENTION

This invention provides novel chromatographic columns, apparatus and methods for size exclusion chromatography where significant improvements are achieved through the use of columns packed with generally spherical particles having wedge-shaped macropores. Using such particles as the stationary phase in a chromatographic column allows effective separation of macromolecular components with an approximately linear relationship between chromatographic retention volume and the logarithm of molecular weight of the macromolecules. Such chromatographic columns allow size exclusion chromatography at high flow rates and reduced back pressure, providing faster and more efficient resolution of the components. Size exclusion chromatography according to this invention can employ a variety of solvents including alkaline solvents as the mobile phase.

This invention also provides chromatographic columns having physical dimensions and packing particularly suited and adapted for enhanced size exclusion chromatography. Such columns generally comprise a metal tube packed with generally spherical particles having wedge-shaped macropores where the metal tube has an inner diameter from about 6 mm to about 9 mm and a length from about 250 mm to about 900 mm. In preferred aspects of this invention the wedge-shaped macropores are provided between lamellar and/or acicular crystals extending radially outwardly from a central core region of the particles; such particles can conveniently comprise aluminum oxide, aluminum hydroxide or a mixture thereof.

Among the many advantages provided by this invention is a method for separating macromolecules in a composition by molecular size that utilizes a stationary phase support that is suitable for use with chromatographic systems employing high pressure, high temperature, and a variety of solvents that often cannot be used with stationary phase supports presently used for size exclusion chromatography This invention also provides a method for separating macromolecules by molecular size utilizing generally spherical particles having wedge-shaped macropores as the stationary phase resulting in the separation of a wide range of macromolecules rapidly and effectively without a loss of separation efficiency. This invention also provides a packed column having a greater working volume than existing columns for size exclusion chromatography while allowing for a change in the mobile phase solvent without significant "down time" of the column.

Other and further advantageous aspects of this invention will be made clear or become apparent from the following detailed description and claims.

DETAILED DESCRIPTION OF PREFERRED EMBODIMENTS

It has been found that generally spherical particles having wedge-shaped macropores are particularly useful as the stationary phase in a chromatographic column for resolving and separating macromolecules having molecular weights in the range of $1 \times 10^3$ to $2 \times 10^7$ Daltons.

Such particles having wedge-shaped macropores can advantageously comprise generally spherical particles in the shape of lamellar and/or acicular crystals extending radially outwardly from a central core region, e.g. as disclosed in U.S. Pat. No. 4,822,593, incorporated herein by reference. For many applications such particles conveniently comprise aluminum oxide, aluminum hydroxide or mixtures thereof, e.g. Unisphere TM alumina particles which are in the shape of lamellar crystals extending radially outwardly from a central core region and are available from Biotage, Incorporated (Charlottesville, Va.), e.g. in normal phase adsorption chromatographic columns. Such particles provide a high surface area and are of a generally uniform size with a nominal diameter of about 8-10 micrometers. The spaces between crystals comprising these particles provide wedge-shaped macropores. The macropores between the crystals are continuously variable in size and grow from small to larger values. Since the macropores extend through the particle, they provide improved flow rate capabilities when used as a stationary phase in a chromatographic column. Such improved flow rate reduces the likelihood of high back pressure and provides a more efficient resolution of components. Although not intending to be bound by this theory, it is believed that the continuously variable shape of the macropores creates a different mode of pore that is advantageous for size exclusion chromatography. The spherical nature of the particles also allows, for uniform and efficient packing of a column adapted for size exclusion chromatography. For many applications the particles will advantageously comprise acicular crystals having a diameter ratio of 3:2 to 10:1.

Figure 1:
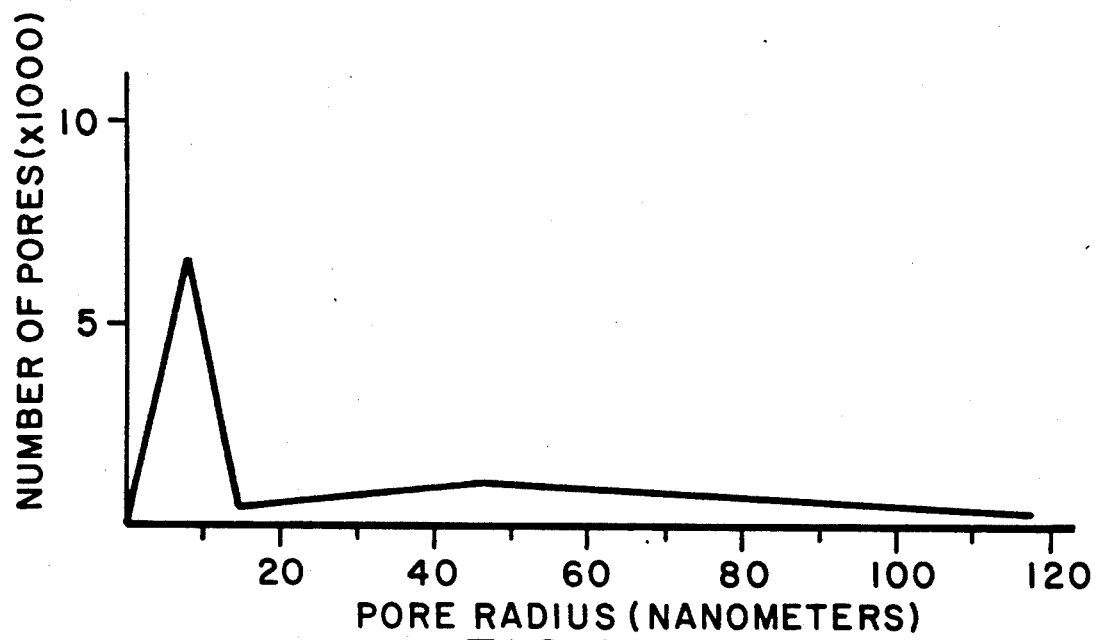
FIG. 1 is a graphical representation of the pore size distribution of an alumina particle useful in this invention.

Although the crystals comprising the particles can be essentially pore free, especially useful particles are microporous, providing effectively cylindrical micropores, e.g. 5 to 10 nanometers (nm), within the crystals comprising the particles. Such particles provide a bimodal pore size distribution substantially in the range of about 5 to about 120 nm. Generally the particles provide a first mode of micropores having an effectively cylindrical radius of about 5 to 10 nm, and a second mode of macropores having a variable wedge radius of about 10 to 120 nm. FIG. 1 illustrates such bimodal pore size distribution characteristic of Unisphere TM alumina particles (obtained from Biotage Inc.) which are especially useful in this invention.

Preferably the particles used as packing material for size exclusion chromatography columns of this invention provide an approximately linear relationship between chromatographic retention volume and the logarithm of molecular weight of the macromolecules. Even more preferably, the particles used for size exclusion chromatography in this invention are capable of separating macromolecules in a composition having a molecular weight range of from about $1 \times 10^3$ to about $2 \times 10^7$ Daltons. For instance, such particles can provide chromatographic columns which are capable of size exclusion chromatographic performance equivalent to separating polystyrene having a molecular weight of about 20,000,000 Daltons and polystyrene having a molecular weight of about 1,000,000 Daltons. Preferred size exclusion chromatography performance can be demonstrated using a column packed with such particles and having an inner diameter of 6.2 milliliters and length of 250 millimeters. Preferred aspects of the chromatographic columns, apparatus and methods of this invention can be characterized as having the ability to separate a mixture of polystyrenes dissolved in tetrahydrofuran at 25° C. flowing at the rate of at least 2 milliliters per minute (ml/min). Even more preferably the separation can be effected at higher flow rates, e.g. at least 3 ml/min or higher, for instance 4 or 5 ml/min. Still more preferred aspects of this invention can be characterized by such separation of polystyrenes at even higher flow rates, e.g. 6 or 7 ml/min or higher.

Pore size distribution of particles useful in this invention can be determined by a technique called macromolecular porosimetry. This method allows for the determination of pore size, pore size distribution, and pore volume of particles in a column by the measuring a coefficient of distribution ($K_d$) for macromolecules in a size exclusion chromatography process. $K_d$ represents the distribution of macromolecules between pore volume and interparticle volume and is a function of molecular size, pore size and molecular distribution.

Figure 2:
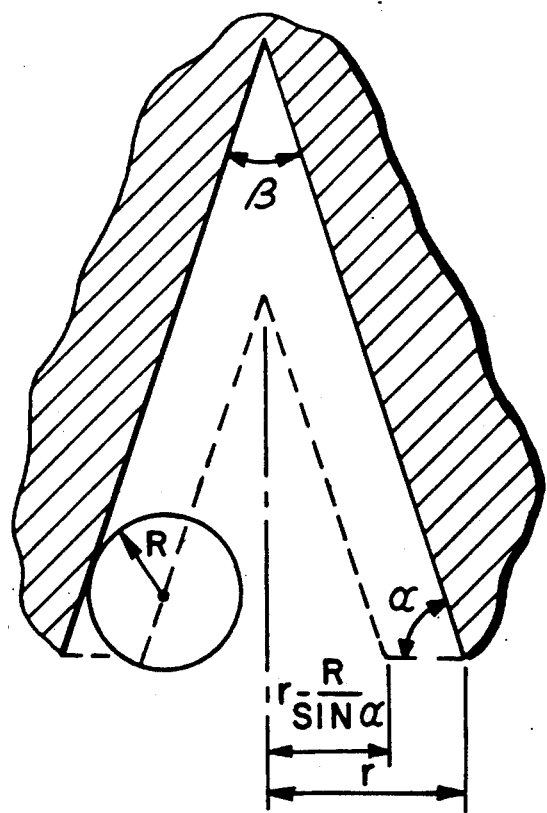
FIG. 2 is a model of a wedge-shaped macropore.
Figure 3A:
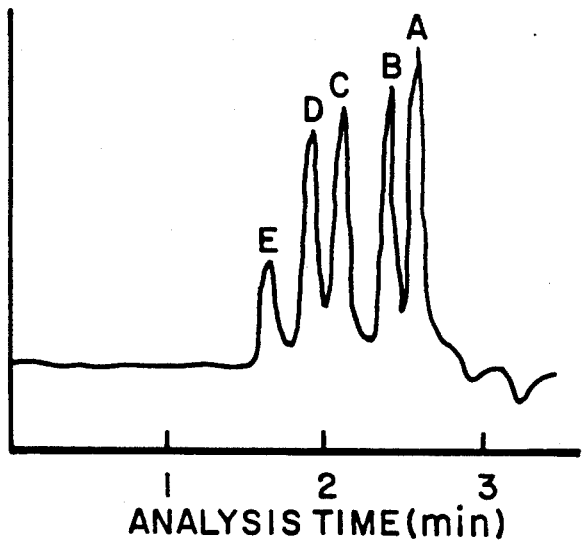
FIGS. 3i, 3ii, 3iii, 3iv, 4, and 5 are chromatograms illustrating the separation of a mixture of polystyrene of different molecular weights by size exclusion chromatography columns of this invention.
Figure 3B:
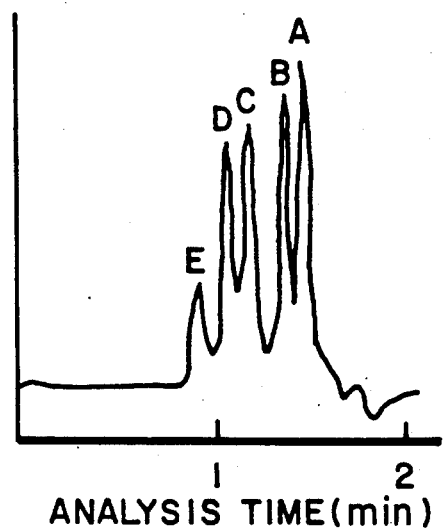
Figure 3C:
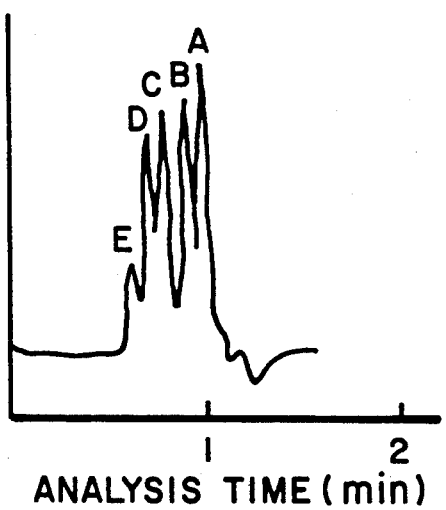
Figure 3D:
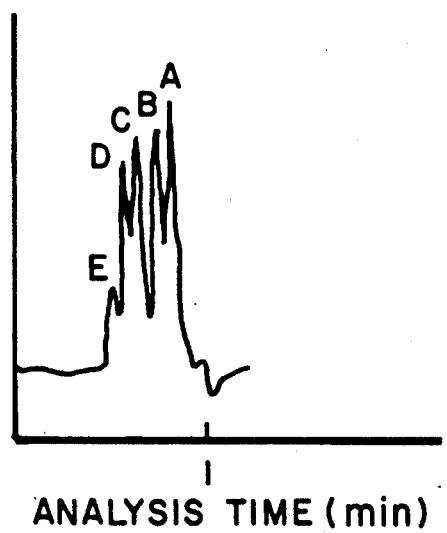

Polystyrene macromolecules of different sizes of known molecular weight were used to determine the pore size distribution of the Unisphere ™ alumina particles as shown in FIG. 1. It was determined through electron micrographs of the alumina particles that the macroporous structure of these particles was wedge shaped as schematically illustrated in FIG. 2. $K_d$ is determined from a chromatographic theory for modelling pores according to the following equation:

$$K_d(R,r) = (1 - R/r)^\lambda \qquad (I)$$

where R = the viscosity radius for a hard spherical molecule, e.g. proteins, and r is the pore radius and $\lambda$ is 1 for wedge-shaped pores, 2 for cylindrical pores and 3 for spherical pores. With reference to FIG. 2 because wedge-shaped macropores are continuously variable in size, the varying angle of the pore walls must be considered in determining $K_d$. The model used to account for the varying angle of the pore walls was an average of all angles between zero and $\pi/3$. Incorporation of this model into Equation I yields:

$$K_d = 1 - (R/r)(6/\pi) \int 1/\sin a \, da = 1 - R/(r/1.05) \qquad (II)$$

where r is the average pore radius for the usual slit pore model. r is the average effective pore radius obtained by taking into account the slope between pore walls, the angle of the slope between slit walls, $2\beta$, which varies between 0 and $\pi/6$, which results in r=r/1.05.

The integral in Equation II is calculated to obtain an equation similar to Equation I except that the average effective pore radius, r, is substituted for the pore radius, r, which results in the equation:

$$K_d(R,r) = (1 - R/r). \qquad (III)$$

If the particles have a distribution of pore size, then the $K_d$ obtained is an average of some distribution of $K_d$'s as a result of the pore size distribution. $K_d$ must then be written as a function of both the average effective pore size and the pore size distribution (W(r)):

$$<K_d(R)> = \int K_d(R,r) W(r) dr. \qquad (IV)$$

Equation IV can be applied using flexible chain polymer standards, e.g. polystyrene macromolecules, instead of hard spherical macromolecules, such as proteins. With flexible chain polymer standards, the determination of $K_d$ must consider the many potential conformations of different sizes of the polystyrene macromolecules. It is convenient to consider the macromolecular coils as ensembles of some equivalent spheres and that each of these spheres corresponds to one possible macromolecular conformation. The distribution of sizes using this model can be described as follows:

$$F(R,R) = 4\pi((\tfrac{3}{2})\pi R^2)^{-3/2}(R^2 \exp(-3R^2/2R^2)) \qquad (V)$$

where R = the viscosity radius for flexible chain macromolecules:

$$R = (KM^a)/(N_a(10/3)\pi)^{\frac{1}{3}} \qquad (VI)$$

where $N_a$ = Avogadro's number and K and a are constants from the Mark-Houwink equation: $[\eta] = KM^a$ where $[\eta]$ is intrinsic viscosity. Using the distribution of sizes of macromolecules F(R,R), and the distribution of pore sizes W(R,r), an expression for the experimental value of $K_d\exp$ is obtained:

$$K_d\exp = \int <K_d(R,R)> F(R,R) dR. \qquad (VII)$$

Using experimental values of $K_d\exp$ and Equations IV-VI, the pore size distribution, W(r)dr, can be determined from Equation IV.

Experimentally, $K_d$ is determined by passing polystyrenes of different molecular weights through a column packed with the alumina particles. The $K_d$ for the polystyrene macromolecules is determined as follows:

$$K_d = (v - v_0)/(v_t - v_0) \qquad (VIII)$$

where v is the retention volume of polystyrene material in the column, $v_t$ is the total volume in the column minus the volume of the particle matrix and $v_0$ is the interparticle volume (the space in the column outside of the spherical limits of the particles. The total volume of the column is usually determined by the retention volume of the mobile phase. In the case of very small molecules where essentially all of the pore space of the particle is available to the molecules, v will approach $v_t$. And, in the case of very large molecules where the pores are essentially inaccessable to the molecules, v will approach $v_0$. That is, $v_0$ may be determined as a retention volume of a high molecular weight macromolecule that is excluded from the pores. The pore volume or interstitial volume of the column is the difference between the total volume ($v_t$) and the interparticle volume ($v_0$). From these experimental values, the coefficients of distribution for the polystyrene macromolecules can be determined and the pore size distribution (W(r)) determined as described above.

The alumina particles may also be coated with an appropriate material that does not interfere with the ability of the particles to effectively separate a wide range of macromolecules according to their size. For instance, particles may be coated with phosphates, siloxanes or polymers, e.g. polybutadiene and copolymers of styrene-butadiene or acrylonitrile-butadiene. A polymer coating should be applied as an oligomer having a sufficiently low molecular weight, e.g. less than 50,000 Daltons, so as to penetrate the pores of the substrate and not block pores thereby reducing the effective surface area of the substrate. Preferably, the oligomer will have a molecular weight of less than 25,000 Daltons; more preferably, the oligomer will have a molecular weight of less than 10,000 Daltons. It may be advantageous to use oligomers of lower molecular weight, i.e. less than 10,000, such as by in situ polymerization methods, as disclosed in application Ser. No. 07/664,167, now U.S. Pat. No. 5,100,547.

A chromatographic column according to this invention will comprise a metal tube having opposing first and second ends and an interior volume. A packed column may be prepared using standard methods and techniques known to those skilled in the art, including dry packing, wet or slurry packing, or downflow or upflow packing methods. A column for size exclusion chromatography can comprise a metal tube having an inner diameter selected from a wide variety of sizes, e.g. 1.5, 4.6, 7.5, 7.8, 8, 9.4, 10 or 21 millimeters (mm), and a length from about 250 mm to about 900 mm. Nonetheless, columns of this invention especially adapted to size exclusion chromatography will comprise metal tubes having a nominal length of 300 mm and a nominal inner diameter of about 8 mm, typically 7.5, 7.8 or 8.0 mm; larger or smaller inner diameters are not adapted to most size exclusion chromatography apparatus and methods and thus are not generally used for size exclusion chromatography. Although a single column may be used, a plurality of columns may be used in series to effect the desired separation. When more than one column is used in series, the inner diameter of the columns typically remains constant from one column to the next. Often, two, and sometimes up to four, columns are used sequentially to effect the desired resolution. In those instances, the total length of the combined columns can exceed 600 mm. As a result of the large working volume provided by the use of the alumina particles as described above as the stationary phase in a column, the number or length of columns necessary to effect a desired separation is expected to be substantially reduced when using the columns of this inventions.

The design and material of the column must be constructed to withstand high pressures, up to 80 mega Pascals, the chemical action of the solvent mobile phase, and elevated temperatures without affecting the stationary phase. In this regard, columns are usually made of metal tubing, e.g. stainless steel. Modern chromatographic columns typically consist of a stainless steel tube fitted at both ends with frits (screens) for retaining the stationary phase in the column and connectors for attaching tubing or other means for supplying a liquid material to the input end of the column and means for retrieving or removing the liquid from the output end of the column after the liquid material has passed therethrough. While the tube is preferably made of metal to withstand the sometimes harsh conditions of the chromatographic system, other materials such as polycarbonate or other durably strong plastics may be used for less severe applications. Connected to the tube or chromatographic column is a means for supplying liquid material to the column. The liquid material to be supplied includes the composition having the components to be resolved by size, and the mobile phase solvent or eluent. The chemical composition (or sample) having the components desired to be separated or resolved by size may be in the nature of a solution, a mixture, a colloidal suspension or the like, depending upon the nature of the components and the solubility thereof. Typically, the sample is introduced to the column by a separate injector and the mobile phase solvent is introduced from a reservoir coupled to a pump. A variety of means to introduce the sample to the column are known in the art and can be used in connection with the present invention such as a syringe injector, a sampling valve, and automatic injectors. The sample injector should be convenient to use, ensure reproducibility of injection and be operable at high temperatures. The choice of pump to introduce the mobile phase solvent to the column should ensure a highly stable, precisely measured and programmed flow of an eluent. A variety of pumps are known for use in chromatographic systems such as constant flow rate pumps, reciprocating pumps, positive displacement (syringe) pumps and constant pressure pumps. A filter placed in line below the pump may be used as well as a pressure gauge to monitor the pressure in the system.

At the output end of the column is a means, typically tubing, for removing the eluate from the column for further processing or analysis. The eluate is then taken through a detector to detect the presence of a component of the sample loaded onto the column. The main characteristic for selecting a detector is its sensitivity: the value of the signal corresponding to the change in substance concentration in the eluate. Commonly used detectors include: differential refractometers, including Fresnel refractometers, deflection refractometers, and interferometric refractometers; ultra violet-visible photometric detectors such as photometers and spectrophotometers; infrared spectrophotometric detectors; fluorometric detectors; an specialized detectors such as low-angle laser light scattering (LALLS) detectors and viscometric detectors. A recorder system is preferably coupled to the detector to record the results of the separation or resolution. A variety of recorder systems are known to those skilled in the art. A data analyzing system may also be coupled with the detector system or used separately to analyze the results of the chromatogram developed from the chromatography. The entire chromatographic system may be integrated into one working unit or may be made of individual parts.

Chromatographic columns according to this invention packed with generally spherical alumina particles having wedge-shaped macropores exhibit good flow rate capabilities with reduced back pressure on the column and are able to withstand the high pressure, high temperatures and wide variety of solvents used in modern chromatographic systems. Exemplary solvents that can be used advantageously in connection with columns packed with the particles as described include tetrahydrofuran (THF), aromatic hydrocarbons such as toluene and benzene, ketones such as acetone and methylethyl ketone, esters such as ethylacetate and aqueous solutions having a pH from 4 to 9 or wider, e.g. 1–14.

The following examples will serve to better illustrate this invention.

EXAMPLE 1

This example illustrates the use of chromatographic columns of this invention packed with generally spherical alumina particles in the shape of lamellar and/or acicular crystals extending radially outwardly from a central core region to resolve macromolecules having a wide range of molecular size. A stainless steel column, 8.1 mm internal diameter (ID) and 310 mm long, was packed with uncoated Unisphere TM alumina particles obtained from Biotage Inc. The column was installed in a chromatographic system using THF as the mobile phase. Polystyrene of several standard molecular weights (MW), i.e. 3,250; 28,500; 156,000; 1,030,000; and 8,500,000 Daltons were dissolved in THF and loaded onto the column. The flow rate for the column was varied as set forth in Table 1 and the temperature maintained at 18° C. The eluate was detected by a Waters 410 differential refractometer as it eluted from the column. The polystyrenes were resolved by the column and separated from each other with distinctive peaks for each molecular weight of polystyrene in the chromatogram. The polystyrene having a molecular weight of $8.5 \times 10^6$ Daltons eluted first from each column and the polystyrene having a MW of 3,250 Daltons eluted last. The time of analysis or separation time to effect this separation at each flow rate is presented in Table 1. The corresponding chromatogram illustrating the resolution of the polystyrenes at various flow rates are also identified in Table 1.

TABLE 1

| Flow Rate | Separation Time | Chromatogram |
| --- | --- | --- |
| 1 ml/min | 14 minutes | FIG. 3 i |
| 4 ml/min | 3.5 minutes | FIG. 3 ii |
| 7 ml/min | 2 minutes | — |
| 10 ml/min | 1.4 minutes | — |
| 12 ml/min | 1.2 minutes | FIG. 3 iii |
| 14 ml/min | 1 minute | FIG. 3 iv |

This example illustrates the capability of a column adapted for size exclusion chromatography and packed with alumina particles as described to be run at a high flow rate and efficiently and effectively separate macromolecules according to their respective molecular weights.

EXAMPLE 2

Figure 4:
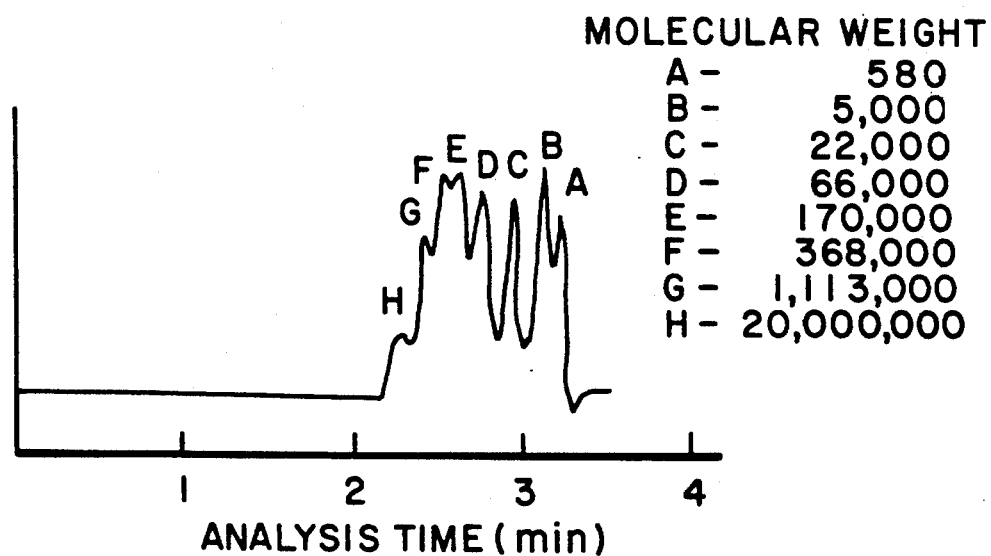

A column as described in Example 1 was prepared and a solution of polystyrenes in THF (molecular weights of 20,000,000; 1,113,000; 368,000; 170,000; 68,000; 22,000; 5,000; and 580 Daltons) Was passed through the column at 4 ml per minute. The polystyrenes were effectively resolved and separated by the column at this flow rate in 3.5 minutes. The chromatogram in FIG. 4 illustrates distinct peaks for each of the eight different molecular weight polystyrenes. This example illustrates the ability of the alumina particles, as described in this specification, to efficiently separate macromolecules having molecular weights of at least about $2 \times 10^7$ Daltons.

EXAMPLE 3

This example illustrates the use of a chromatographic column of this invention for size exclusion chromatography wherein the alumina particles, as previously described, have been coated with a polybutadiene polymer. Polybutadiene oligomer (99% unsaturation; 25% 1-2; 40% trans 1,4-; and 35% cis 1,4-) was partially hydrogenated by reacting molar equivalent quantities of the polybutadiene oligomer with 0.9 mole equivalent of p-toluene sulfonhydrazide in boiling toluene. The partially hydrogenated polybutadiene was coated onto Unisphere TM alumina particles by mixing 1 part of alumina particles with 0.1 part of partially hydrogenated polybutadiene and 0.005 part of dicumyl peroxide in a toluene medium providing a crosslinked polybutadiene coating with essentially no vinyl groups, i.e. the polybutadiene had attached thereto ethyl groups at a level of about 20 mole percent per butadiene monomer unit. The toluene was removed by evaporation and the oligomer crosslinked by heating to 160° C. in the absence of air. Chromatographic columns were prepared by loading the polybutadiene-coated alumina particles into two stainless steel tubes (one was 260 mm long × 8.4 mm ID, the other 310 mm long × 8.1 mm ID). A solution of polystyrenes with molecular weights as described in Example 2 were loaded onto the column with THF as the mobile phase. The 260 mm × 8.4 mm column was run at 4 ml/minute and the 310 mm × 8.1 mm column was run at 6 ml/minute. The columns were otherwise run as described in Example 1.

Figure 5A:
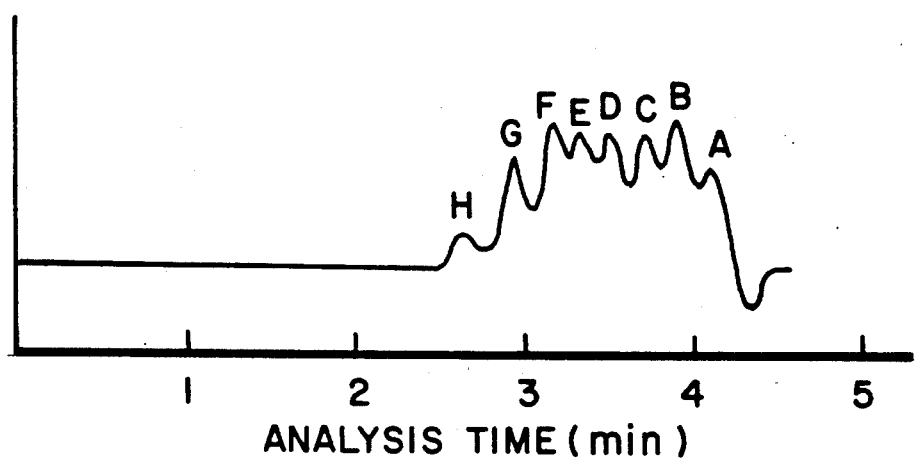
Figure 5B:
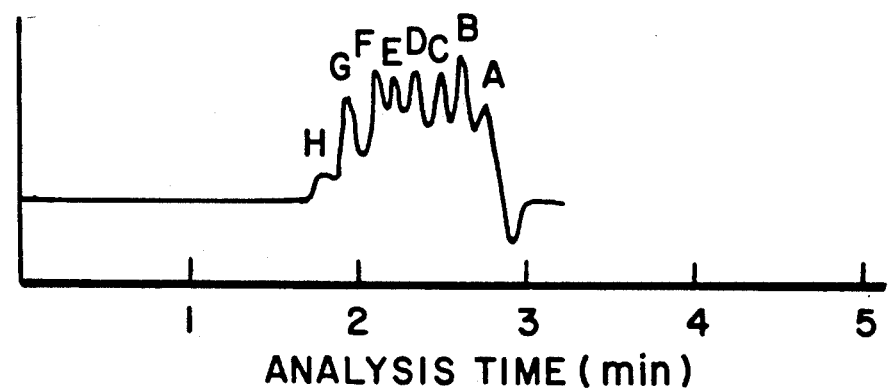

The chromatograms for these columns illustrate distinct peaks for each of the molecular weight polystyrenes with a time of analysis of 4.5 minutes and 3 minutes, respectively, for the columns. This illustrates that the alumina particles continue to function as an effective stationary phase for size exclusion chromatography even when coated with a polymer. The chromatograms for these two columns are presented in FIGS. 5i (4.5 minute analysis) and 5ii (3 minute analysis).

EXAMPLE 4

This example illustrates the superior performance of a column packed with alumina particles having wedge-shaped macropores for size exclusion chromatography as compared to a silica based bimodal stationary phase chromatographic system of the prior art.

A Zorbax PSM silica of two distinct pore sizes was obtained from E. I. DuPont de Nemours & Co.(Wilmington, Del.). The Zorbax silica was loaded into two stainless steel tubes, both 250 mm long × 6.2 mm ID. A mixture of polystyrenes having molecular weights of 20,000,000; 1,113,000; 368,000; 170,000; 68,000; 22,000; and 5,050 were loaded to the column and the column was run at a flow rate of either 1 ml/minute or 2 ml/minute. The mobile phase was THF and the temperature maintained at 25° C. The polystyrene eluting from the column was detected by a Waters 410 differential refractometer. The time of analysis was about 5 minutes.

Figure 6A:
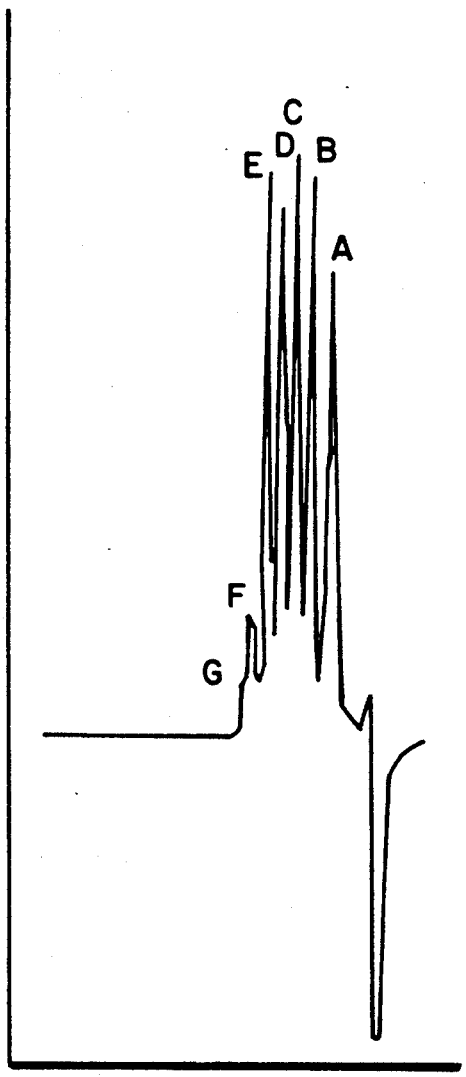
FIG. 6 is a pair of chromatograms illustrating the separation of a mixture of polystyrene of different molecular weight using a prior art column packed with generally spherical silica particles having a bimodal pore size distribution.
Figure 6B:
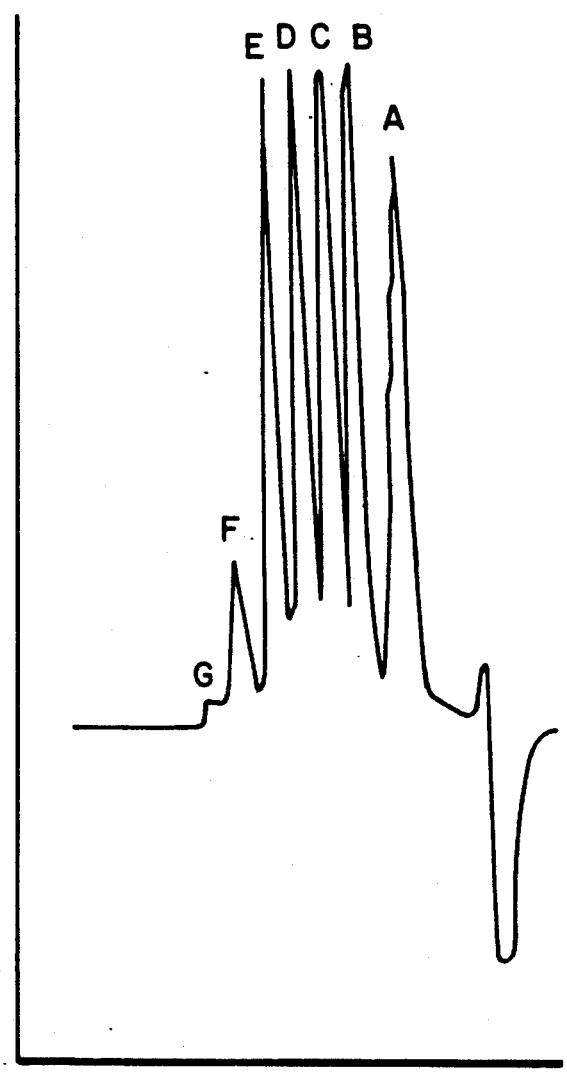

When the Zorbax columns were run at 1 ml/minute each of the eight polystyrene molecular weight standards were effectively separated and a distinct peak was evident on the chromatogram. When the columns were run at 2 ml/minute the two highest molecular weight polystyrenes were not able to be resolved by the columns and distinct peaks were not evident on the chromatograms. These chromatograms are presented in FIGS. 6i (1 ml/min) and 6ii (2 ml/min).

This example illustrates the inability of a silica based bimodal stationary phase to effectively separate macromolecules having a molecular weight larger that about 1,000,000 at high flow rates. A single Zorbax PSM bimodal packed column of 250 × 6.2 mm size was unable to separate polystyrenes having a molecular weight greater than 1,000,000 at any flow rate.

While specific embodiments have been described herein, it should be apparent to those skilled in the art that various modifications thereof can be made without departing from the true spirit and scope of the invention. Accordingly, it is intended that the following claims cover all such modifications within the full inventive concept.

What is claimed is:

1. A method for separating macromolecules of different molecular weight by size exclusion chromatography comprising passing a solution of said macromolecules through a column packed with spherical particles comprising aluminum oxide, aluminum hydroxide, or a mixture thereof having wedge-shaped macropores at a flow rate whereby said macromolecules are eluted from said column in descending order of molecular weight.

2. A method according to claim 1 wherein said macropores are in the range of 10 to 120 nanometers.

3. A method according to claim 2 comprising separating macromolecules having molecular weights in the range of $1 \times 10^3$ to $2 \times 10^7$ Daltons.

* * * * *